United States Patent
An et al.

(10) Patent No.: US 11,228,903 B2
(45) Date of Patent: Jan. 18, 2022

(54) 5G SERVICE COMPATIBLE 4G SIM

(71) Applicant: T-Mobile USA, Inc., Bellevue, WA (US)

(72) Inventors: Kyeong Hun An, Sammamish, WA (US); Phani Ramisetty, Sammamish, WA (US); Mathew George, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 447 days.

(21) Appl. No.: 16/235,191

(22) Filed: Dec. 28, 2018

(65) Prior Publication Data
US 2020/0213843 A1   Jul. 2, 2020

(51) Int. Cl.
| H04L 9/32 | (2006.01) |
| H04W 12/04 | (2021.01) |
| H04L 9/30 | (2006.01) |

(52) U.S. Cl.
CPC .............. *H04W 12/04* (2013.01); *H04L 9/30* (2013.01)

(58) Field of Classification Search
CPC ................................ H04W 12/04; H04L 9/30
USPC .......................................................... 713/171
See application file for complete search history.

(56) References Cited

U.S. PATENT DOCUMENTS

| 2012/0190354 A1 | 7/2012 | Merrien et al. |
| 2013/0170643 A1 | 7/2013 | Xiao et al. |
| 2014/0148162 A1 | 5/2014 | Maharaj |
| 2015/0181419 A1 | 6/2015 | Mistry et al. |
| 2018/0013568 A1 | 1/2018 | Muhanna et al. |
| 2020/0204985 A1 | 6/2020 | An et al. |
| 2021/0021993 A1* | 1/2021 | Yang ............... H04W 12/02 |

(Continued)

FOREIGN PATENT DOCUMENTS

| KR | 20180119651 A | 11/2018 |
| WO | WO2008151663 A1 | 12/2008 |

(Continued)

OTHER PUBLICATIONS

Office Action for U.S. Appl. No. 16/228,635, dated Feb. 19, 2021, An, "5G Device Compatibility With Legacy SIM", 9 Pages.

(Continued)

*Primary Examiner* — Jeffrey C Pwu
*Assistant Examiner* — Samuel Ambaye
(74) *Attorney, Agent, or Firm* — Lee & Hayes, P.C.

(57) ABSTRACT

The methods, systems, and computer readable media discussed herein are directed to enabling a fifth generation cellular-wireless access technology (5G) user equipment (UE) to receive 5G service using a fourth generation cellular-wireless access technology (4G) subscriber identity module (SIM). Upon powering on, the 5G UE may determine whether a mobile network operator (MNO) public key file exists in the 4G SIM. Upon determining that the MNO public key file exists in the 4G SIM, the 5G UE may retrieve a MNO public key value from the MNO public key file, read a subscription permanent identifier (SUPI) from the 4G SIM, generate a subscription concealed identifier (SUCI) based on the SUPI and the MNO public key value, send the SUCI to a 5G mobile network for registering the 5G UE, and begin receiving 5G services from the 5G mobile network.

20 Claims, 3 Drawing Sheets

(56) References Cited

U.S. PATENT DOCUMENTS

2021/0092603 A1\* 3/2021 Yang .................... H04L 9/0844

FOREIGN PATENT DOCUMENTS

WO     WO2016209126 A1    12/2016
WO     WO2017007725 A1     1/2017

OTHER PUBLICATIONS

China Mobile, "Discussion and pCR for privacy calculation in UE side", S3-180533, 3GPP TSG SA WG3 (Security) Meeting #90bis, Feb. 2018, section 3, 4 pages.
Ericsson, "Protection scheme selection using legacy USIM", S3-181919, 3GPP TSG-SA WG3 Meeting #91 Bis, May 2018, Section 6.12.2, 5 pages.
Gemalto, "Comments to S3-171776 on Storage, processing and provisioning of the home network public key", S3-172071, 3GPP TSG SA WG3 (Security) Meeting #88, Aug. 2017, Section 2, 5.1.4, 4 pages.
Khan, et al., "Defeating the Downgrade Attack on Identity Privacy in 5G", In: SSR 2018: Security Standardisation Research, Nov. 6, 2018, sections 3,4.2-4.3, 5.4; and figure 4, p. 1-25.
The PCT Search Report and Written Opinion dated Mar. 26, 2020, for PCT Application No. PCT/US2019/064236, 10 pages.
The PCT Search Report and Written Opinion dated Apr. 7, 2020 for PCT Application No. PCT/US2019/065224, 11 pages.

\* cited by examiner

5G SERVICE COMPATIBLE 4G SIM

BACKGROUND

Modern telecommunications systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. As increased capabilities of user equipment (UE) enable greater data consumption, placing increased demands on networks, new networks with higher capabilities have been developed. The 5G telecommunications technologies are the next generation mobile networks that are designed to combine both an evolution and revolution of the existing LTE/LTE-A mobile networks to provide a much higher connectivity, greater throughput, much lower latency, and ultra-high reliability to support new use cases and applications.

To access 5G services, a user equipment (UE), such as a 5G mobile telephone, will require 5G key features including an international mobile subscriber identity (IMSI) privacy feature for 5G Core service from a subscriber identity module (SIM), or a SIM card, of the UE. However, because 4G/LTE SIMs do not have the IMSI privacy feature, a 5G UE with a 4G/LTE SIM will not be able to access 5G services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The methods, devices, and computer readable media discussed herein are directed to a fourth generation cellular-wireless access technology (4G) subscriber identity module (SIM), and more specifically, to enabling the 4G SIM to be used in a fifth generation cellular-wireless access technology (5G) user equipment (UE) for receiving 5G services.

4G SIMs do not have required 5G features, such as an international mobile subscriber identifier (IMSI) privacy, to access 5G services. Therefore, although the 4G SIM may be compatible with both a 4G UE and a 5G UE, the 5G UE would not be able to receive 5G services with the 4G SIM. To enable the 5G UE to receive 5G service with the 4G SIM, the 4G UE, while having the 4G SIM, may receive a first over-the-air (OTA) command from a 4G mobile network to create a mobile network operator (MNO) public key file on the 4G SIM. The 4G UE may also receive a second OTA command from the 4G mobile network to update a MNO public key value in the MNO public folder. The 4G SIM may comprise one or more processors and memory coupled to the one or more processors. The memory may be configured to store the MNO public key file and the MNO public key value in the MNO public key file.

The 4G SIM may then be placed in the 5G UE, and upon powering on, the 5G UE, or more specifically one or more processors of the 5G UE, may determine whether the MNO public key file exists in the 4G SIM. Upon the 5G UE determining that the MNO public key file exists in the 4G SIM, the 4G SIM may have the MNO public key value retrieved from the MNO public key file, have a subscription permanent identifier (SUPI) read from the 4G SIM, have a subscription concealed identifier (SUCI) generated based on the SUPI and the MNO public key value, and have the SUCI sent to a 5G mobile network for registering the 5G UE. The SUPI in the 4G SIM may be an IMSI, or another identifier based on the IMSI. The SUCI may be generated by encrypting the SUPI based on the MNO public key value to improve IMSI privacy. After the 5G UE is registered with the 5G mobile network, it may begin receiving 5G services from the 5G mobile network.

However, if the 5G UE determines that the public key file does not exist in the 4G SIM, then the 4G SIM may have the IMSI read from the 4G SIM and sent to the 5G mobile network, or have the SUPI read from the 4G SIM and sent to the 5G mobile network.

Figure 1:
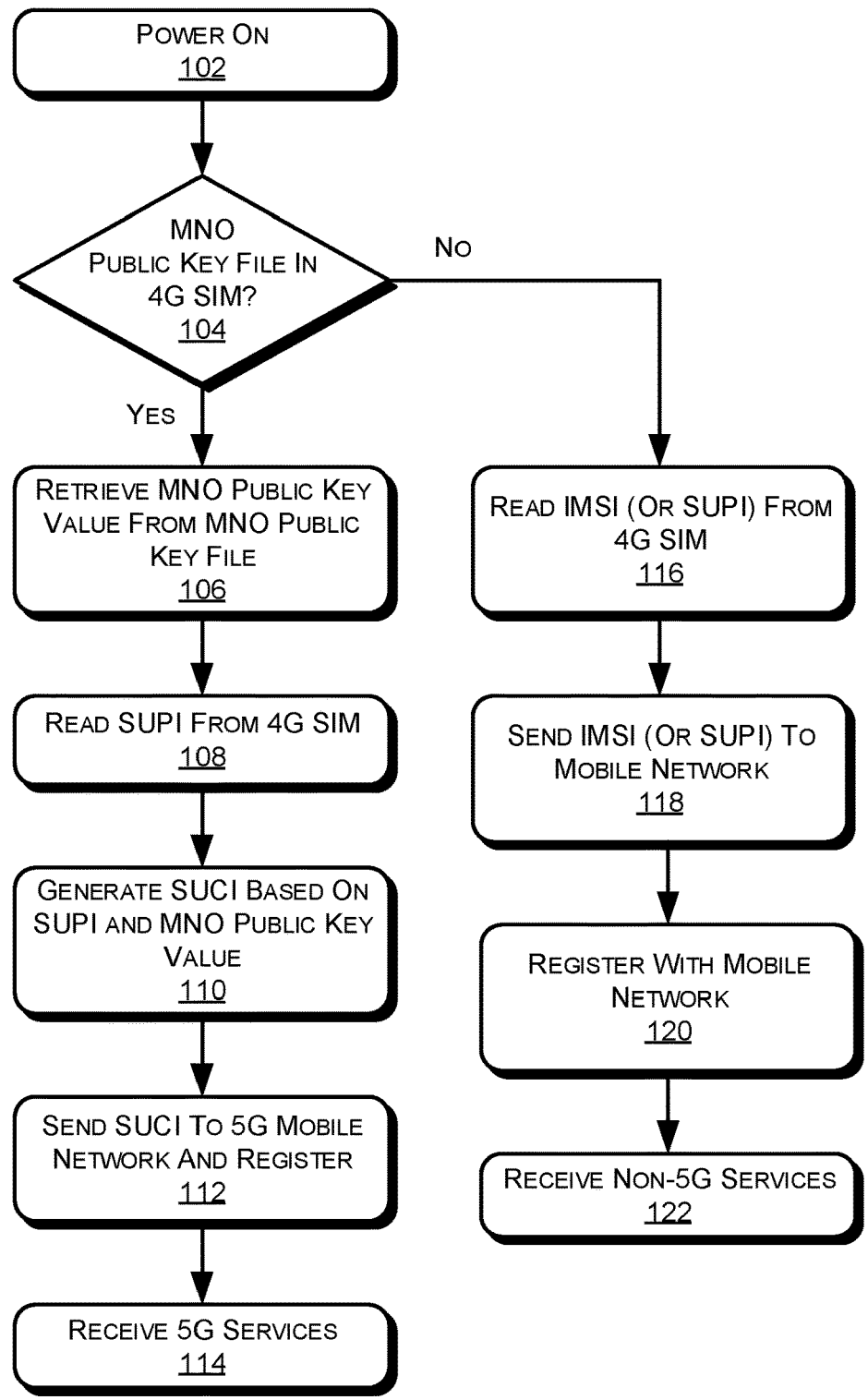
FIG. 1 illustrates an example process in a 5G UE with a 4G SIM for accessing 5G services.

FIG. 1 illustrates an example process 100 in a UE with a SIM for accessing 5G services.

The UE may be a 5G UE and the SIM may be a 4G SIM that is compatible with the 5G UE and a 4G UE. Upon powering on at block 102, the 5G UE may determine whether an MNO public key file exists in the 4G SIM at block 104. Upon determining that the MNO public key file exists in the 4G SIM ("YES" branch from block 104), the 5G UE may retrieve an MNO public key value from the MNO public key file at block 106. The 5G UE may then read a SUPI from the 4G SIM at block 108 and may generate a SUCI based on the SUPI and the MNO public key value at block 110. The SUPI may be an IMSI or an identifier based on the IMSI, and security of the IMSI may be improved by encrypting the SUPI based on the MNO public key value at block 110. The 5G UE may then send the SUCI to a mobile network, such as a 5G mobile network, for registering the 5G UE with the mobile network at block 112. The 5G UE may begin receiving 5G services from the 5G mobile network at block 114.

If the 5G UE determines that the public key file does not exist in the 4G SIM at block 104 ("NO" branch from block 104), the 5G UE may read the IMSI, or the SUPI, from the 4G SIM at block 116, and send the IMSI, or the SUPI, to an available non-5G mobile network at block 118. The 5G UE may then register with the available mobile network at block 120 and begin receiving non-5G services at block 122.

Figure 2:
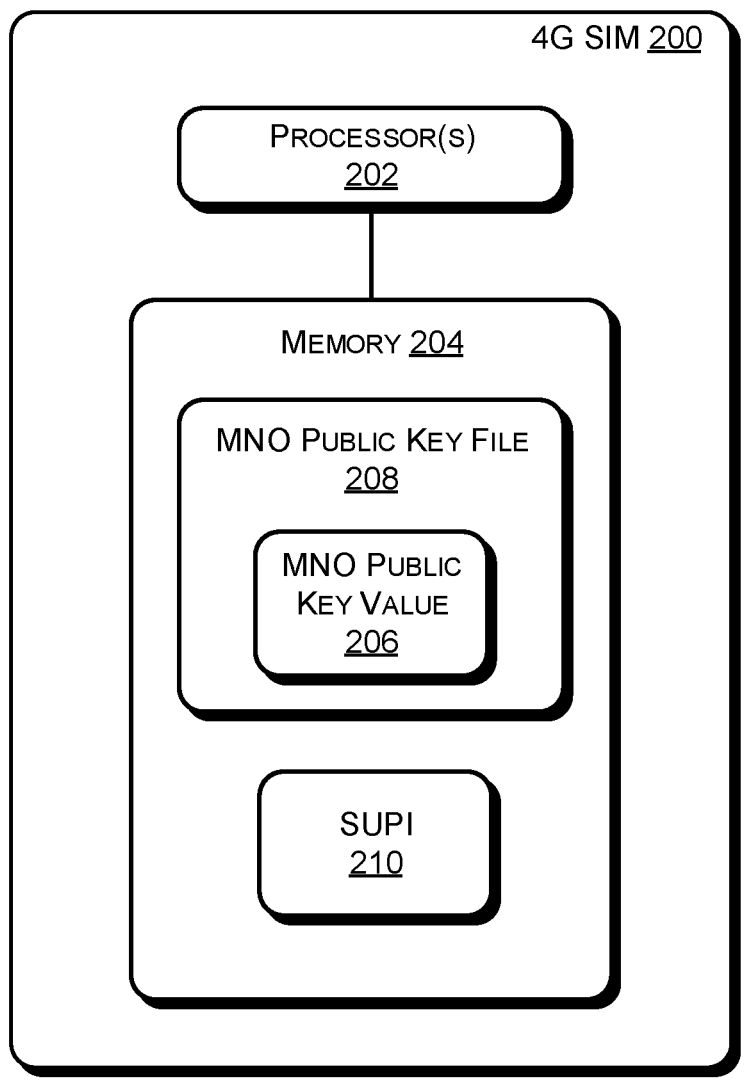
FIG. 2 illustrates an example block diagram of the 4G SIM for a 5G UE to access 5G services.

FIG. 2 illustrates an example block diagram of the 4G SIM 200 for a 5G UE to access 5G services.

The 4G SIM 200 may comprise one or more processors 202 and memory 204 coupled to the one or more processors 202. The memory 204 may be configured to store an MNO public key value 206 in a MNO public key file 208, and a SUPI 210. The SUPI 210 may be an IMSI or another identifier based on the IMSI. The 4G SIM 200 may be configured to have the MNO public key value 206 retrieved from the MNO public key file 208 while the 4G SIM 200 is placed in a 5G UE, have the SUPI 210 read from the memory 204, have a SUCI generated based on the SUPI 210 and the MNO public key value 206, have the SUCI sent to a 5G mobile network for registering the 5G UE, and have 5G UE receive 5G services from the 5G mobile network. The SUCI may be generated by encrypting the SUPI 210 based on the MNO public key value 206 to improve security of the IMSI. The 5G UE may determine whether the MNO public key file 208 exists in the memory 204 of the 4G SIM 200 upon powering on, and the 4G SIM 200 may be further configured to have the MNO public key value 206 retrieved from the MNO public key file 208 upon the 5G UE determining that the MNO public key file 208 exists in the memory 204 of the 4G SIM 200.

The 4G SIM 200, while placed in a 4G UE, may be further configured to have the MNO public key file 208 created in the memory 204 of the 4G SIM 200 upon the 4G UE receiving a first OTA command from a 4G mobile network, and have the MNO public key value 206 in the MNO public key file 208 updated upon the 4G UE receiving a second OTA command from the 4G mobile network.

The memory 204 may be further configured to have SUPI, or IMSI, read from the memory 204 upon the 5G UE determining that the MNO public key file 208 does not exists in the memory 204, and have the SUPI, or IMSI, sent to an available mobile network. The 5G UE may then be registered with the available mobile network, which may be a non-5G mobile network, and begin receiving non-5G services from the available mobile network.

Figure 3:
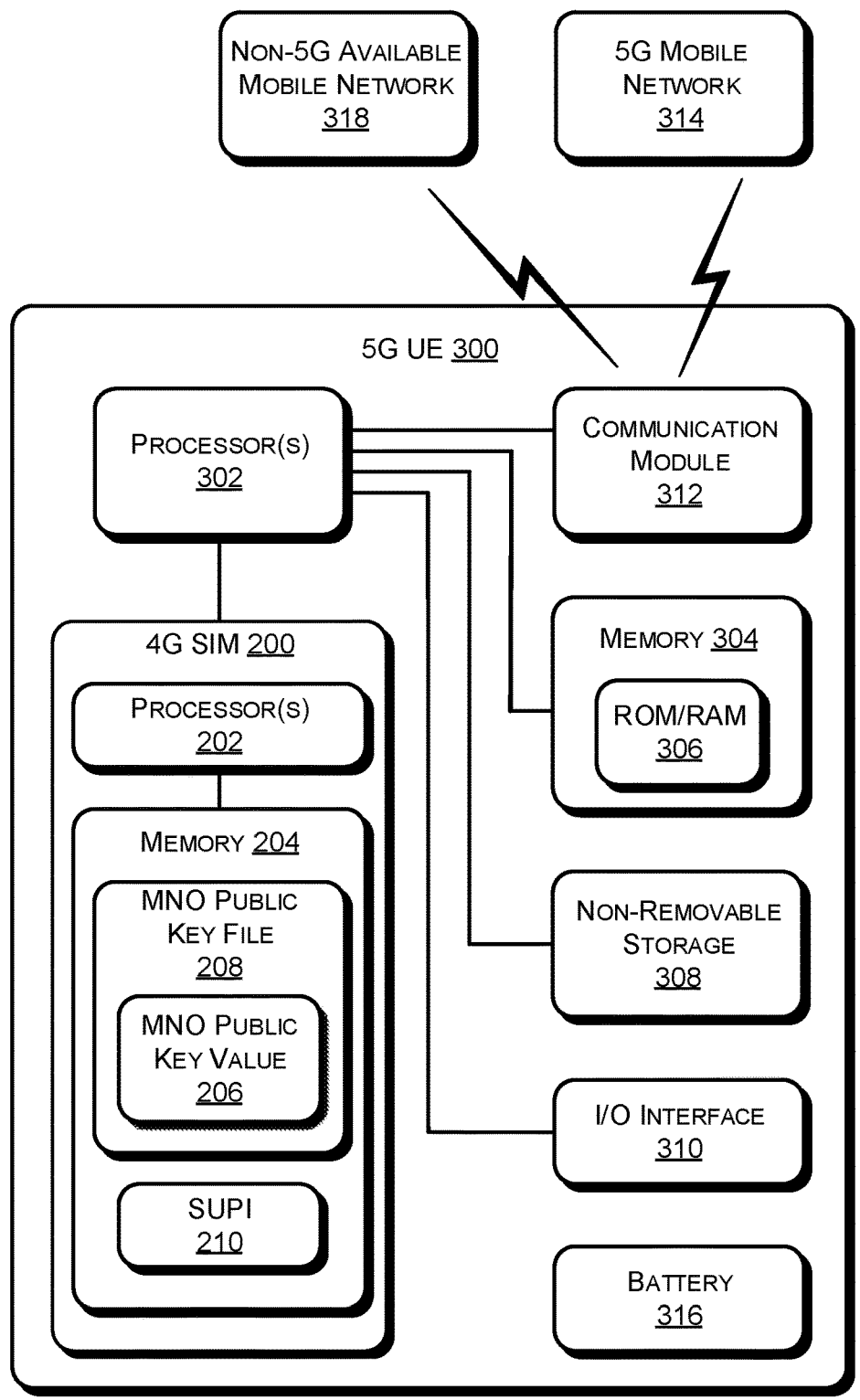
FIG. 3 illustrates an example block diagram of the 5G UE with the 4G SIM for accessing 5G services.

FIG. 3 illustrates an example block diagram of the 5G UE 300 with the 4G SIM 200 for accessing 5G services.

The 5G UE 300 may include one or more processors 302, memory 304 coupled to the one or more processors 302. In some embodiments, the one or more processors 302 may be a central processing unit (CPU), a graphics processing unit (GPU), or both CPU and GPU, or other processing unit or component known in the art. Memory 304 may include volatile memory (such as random-access memory (RANI)) and/or non-volatile memory (such as read-only memory (ROM), flash memory, etc.) 306. The 5G UE 300 may include the 4G SIM card 200 coupled to the one or more processors 302, and non-removable storage 308 including, but not limited to, flash memory, magnetic storage, optical storage, and/or tape storage that may provide non-volatile storage of computer-readable instructions, data structures, program modules, and other data for the 5G UE 300.

The 5G UE 300 may include an Input/Output (I/O) interface 310 coupled to the one or more processors 302 and may include a keyboard, mouse, touch pad, touch screen, microphone, and the like, configured to receive information from a user, and may also include a speaker, display which may be a touchscreen, and the like, configured to provide an output for the user. The 5G UE 300 may include a communication module 312 coupled to the one or more processors 302 and configured to wirelessly communicate with a 5G mobile network 314. The 5G UE 300 may also include a battery 316 configured to power all components of the 5G UE 300.

The memory 304, a non-transitory computer storage medium, may store computer-readable instructions executable by the one or more processors 302, that when executed by the one or more processors 302, cause the one or more processors 302 to perform operations described above with referenced to FIGS. 1 and 2. For example, when the 5G UE 300 is powered on, the one or more processors 302 may determine whether the MNO public key file 208 exists in the 4G SIM 200, more specifically, in the memory 204 of the 4G SIM 200. Upon determining that the MNO public key file 208 exists in the 4G SIM 200, the one or more processors 302 may retrieve the MNO public key value 206 from the MNO public key file 208, read the SUPI 210 from the 4G SIM 200, generate the SUCI based on the SUPI 210 and the MNO public key value 206, and send the SUCI to the 5G mobile network 314, via the communication module 312.

The SUPI 210 may be an IMSI or another identifier based on the IMSI, and the one or more processors 302 may encrypt the SUPI 210 based on the MNO public key value 206 to generate the SUCI for improving security of the IMSI. After registering the 5G UE 300 with the 5G mobile network 314, the 5G UE 300 may then begin receiving 5G services from the 5G mobile network 314.

If, upon powering on the 5G UE 300, the one or more processors 302 determines that the MNO public key file 208 does not exist in the 4G SIM 200, the one or more processors 302 may read the SUPI 210, or the IMSI, from the 4G SIM 200, and send the SUPI 210, or the IMSI, via the communication module 312, to an available non-5G mobile network 318. The 5G UE 300 may then begin receiving non-5G services from the non-5G available mobile network 318.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The memory 204 and the memory 304, discussed above with referenced to FIGS. 2 and 3, respectively, are examples of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The computer-executable instructions stored on one or more computer-readable storage media that, when executed by one or more processors, perform operations described above with reference to FIGS. 1, 2, and 3. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses A. A method in a user equipment (UE) for having a subscriber identity module (SIM), the method comprising: determining whether a mobile network operator (MNO) public key file exists in the SIM; upon determining that the MNO public key file exists in the SIM: retrieving an MNO public key value from the MNO public key file; reading a subscription permanent identifier (SUPI) from the SIM; generating a subscription concealed identifier (SUCI) based on the SUPI and the MNO public key value; and sending the SUCI to a mobile network for registering the UE with the mobile network; or upon determining that the public key file does not exist in the SIM: reading an international mobile subscriber identifier (IMSI) from the SIM, and sending the IMSI to an available mobile network; or reading the SUPI from the SIM and sending the SUPI to the available mobile network.

B. The method as paragraph A recites, wherein determining whether the MNO public key file exists in the SIM includes: determining whether the MNO public key file exists in the SIM upon powering on the UE.

C. The method of as paragraph B recites, wherein: the UE is a fifth generation cellular-wireless access technology (5G) UE, the SIM is a fourth generation cellular-wireless access technology (4G) SIM, and the mobile network is a 5G mobile network.

D. The method as paragraph C recites, further comprising: receiving 5G services from the 5G mobile network upon registering with the 5G mobile network.

E. The method as paragraph A recites, wherein the SUPI is one of: an international mobile subscriber identifier (IMSI), or an identifier based on the IMSI.

F. The method as paragraph E recites, wherein generating the SUCI based on the SUPI and the MNO public key value includes improving security of the IMSI by encrypting the SUPI based on the MNO public key value.

G. A fourth generation cellular-wireless access technology (4G) subscriber identity module (SIM) compatible with a 4G user equipment (UE) and a fifth generation cellular-wireless access technology (5G) UE, the 4G SIM comprising: one or more processors; memory coupled to the one or more processors, the memory configured to: store a mobile network operator (MNO) public key value in a MNO public key file; have the MNO public key value retrieved from the MNO public key file; have a subscription permanent identifier (SUPI) read from the memory; have a subscription concealed identifier (SUCI) generated based on the SUPI and the MNO public key value; and have the SUCI sent to a 5G mobile network for registering the 5G UE, in which the 4G SIM is placed.

H. The 4G SIM as paragraph G recites, wherein the 4G SIM is placed in the 5G UE and the 5G UE receives 5G services from the 5G mobile network after having the SUCI sent to the 5G mobile network for registering the 5G UE.

I. The 4G SIM as paragraph H recites, wherein the 4G SIM is placed in the 5G UE, and the memory is further configured to: have the MNO public key value retrieved from the MNO public key file upon the 5G UE determining that the MNO public key file exists in the memory.

J. The 4G SIM as paragraph I recites, wherein the 5G UE is configured to determine whether the MNO public key file exists in the memory upon powering on.

K. The 4G SIM as paragraph H recites, wherein the 4G SIM is further configured to, while placed in the 4G UE: have the MNO public key file created in the memory of the 4G SIM upon the 4G UE receiving a first over-the-air command (OTA) command; and have the MNO public key value in the MNO public key file updated upon the 4G UE receiving a second OTA command.

L. The 4G SIM as paragraph K recites, wherein the 4G UE receiving the first and second commands includes: receiving, by a communication module of the 4G UE, the first and second commands from a 4G mobile network.

M. The 4G SIM as paragraph H recites, wherein the SUPI is one of an international mobile subscriber identifier (IMSI), or an identifier based on the IMSI.

N. The 4G SIM as paragraph M recites, wherein the SUCI generated based on the SUPI and the MNO public key value includes the SUCI generated by encrypting the SUPI based on the MNO public key value to improve security of the IMSI.

O. The 4G SIM as paragraph J recites, wherein the memory is further configured to, upon the 5G UE determining that the public key file does not exist in the 4G SIM: have an international mobile subscriber identifier (IMSI) read from the memory of the 4G SIM and sent to an available mobile network, or have the SUPI from the memory of the 4G SIM read and sent to the available mobile network.

P. A non-transitory computer storage medium configured to store computer-readable instructions by one or more processors of a fifth generation cellular-wireless access technology (5G) user equipment (UE), that when executed, cause the one or more processors to perform operations comprising: determining whether a mobile network operator (MNO) public key file exists in a fourth generation cellular-wireless access technology (4G) subscriber identity module (SIM) of the 5G UE; upon determining that the MNO public key file exists in the 4G SIM: retrieving an MNO public key value from the MNO public key file; reading a subscription permanent identifier (SUPI) from the 4G SIM; generating a subscription concealed identifier (SUCI) based on the SUPI and the MNO public key value; and sending, by the communication module, the SUCI to a 5G mobile network for registering the 5G UE with the 5G mobile network; or upon determining that the public key file does not exist in the SIM: reading an international mobile subscriber identifier (IMSI) from the SIM, and sending the IMSI to an available mobile network; or reading the SUPI from the SIM, and sending the SUPI to the available mobile network.

Q. The non-transitory computer storage medium as paragraph P recites, wherein determining whether the MNO public key file exists in the 4G SIM includes determining whether the MNO public key file exists in the 4G SIM upon powering on the 5G UE.

R. The non-transitory computer storage medium as paragraph P recites, wherein the operations further comprise receiving 5G services from the 5G mobile network upon registering with the 5G mobile network.

S. The non-transitory computer storage medium as paragraph P recites, wherein the SUPI is one of an international mobile subscriber identifier (IMSI), or an identifier based on the IMSI.

T. The non-transitory computer storage medium as paragraph S recites, wherein generating the SUCI based on the SUPI and the MNO public key value includes improving security of the IMSI by encrypting the SUPI based on the MNO public key value.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a user equipment (UE) having a subscriber identity module (SIM), the method comprising:
at a first time,
determining that a mobile network operator (MNO) public key file exists in the SIM; and
upon determining that the MNO public key file exists in the SIM:
retrieving an MNO public key value from the MNO public key file;
reading a subscription permanent identifier (SUPI) from the SIM;
generating a subscription concealed identifier (SUCI) based on the SUPI and the MNO public key value; and
sending the SUCI to a mobile network for registering the UE with the mobile network;
at a second time that is different from the first time,
determining that no MNO public key file exists in the SIM; and
upon determining that no MNO public key file exists in the SIM:
reading an international mobile subscriber identifier (IMSI) from the SIM and sending the IMSI to an available mobile network; or
reading the SUPI from the SIM and sending the SUPI to the available mobile network.

2. The method of claim 1, wherein determining that the MNO public key file exists in the SIM includes:
determining that the MNO public key file exists in the SIM upon powering on the UE.

3. The method of claim 2, wherein:
the UE is a fifth generation cellular-wireless access technology (5G) UE,
the SIM is a fourth generation cellular-wireless access technology (4G) SIM, and
the mobile network is a 5G mobile network.

4. The method of claim 3, further comprising:
receiving 5G services from the 5G mobile network upon registering with the 5G mobile network.

5. The method of claim 1, wherein the SUPI is one of:
an international mobile subscriber identifier (IMSI), or
an identifier based on the IMSI.

6. The method of claim 5, wherein generating the SUCI based on the SUPI and the MNO public key value includes:
improving security of the IMSI by encrypting the SUPI based on the MNO public key value.

7. A fourth generation cellular-wireless access technology (4G) subscriber identity module (SIM) compatible with a 4G user equipment (UE) and a fifth generation cellular-wireless access technology (5G) UE, the 4G SIM comprising:
one or more processors; and
memory coupled to the one or more processors, the memory configured to:
store a mobile network operator (MNO) public key value in a MNO public key file;
have the MNO public key value retrieved from the MNO public key file;
have a subscription permanent identifier (SUPI) read from the memory;
have a subscription concealed identifier (SUCI) generated based on the SUPI and the MNO public key value; and
have the SUCI sent to a 5G mobile network for registering the 5G UE in which the 4G SIM is placed.

8. The 4G SIM of claim 7, wherein the 4G SIM is placed in the 5G UE and the 5G UE receives 5G services from the 5G mobile network after having the SUCI sent to the 5G mobile network for registering the 5G UE.

9. The 4G SIM of claim 8, wherein the 4G SIM is placed in the 5G UE, and the memory is further configured to:
have the MNO public key value retrieved from the MNO public key file upon the 5G UE determining that the MNO public key file exists in the memory.

10. The 4G SIM of claim 9, wherein the 5G UE is configured to determine whether the MNO public key file exists in the memory upon powering on.

11. The 4G SIM of claim 8, wherein the 4G SIM is further configured to, while placed in the 4G UE:
have the MNO public key file created in the memory of the 4G SIM upon the 4G UE receiving a first over-the-air command (OTA) command; and
have the MNO public key value in the MNO public key file updated upon the 4G UE receiving a second OTA command.

12. The 4G SIM of claim 11, wherein the 4G UE receiving the first and second commands includes:
receiving, by a communication module of the 4G UE, the first and second commands from a 4G mobile network.

13. The 4G SIM of claim 8, wherein the SUPI is one of:
an international mobile subscriber identifier (IMSI), or
an identifier based on the IMSI.

14. The 4G SIM of claim 13, wherein the SUCI generated based on the SUPI and the MNO public key value includes the SUCI generated by encrypting the SUPI based on the MNO public key value to improve security of the IMSI.

15. The 4G SIM of claim 10, wherein the memory is further configured to, upon the 5G UE determining that the public key file does not exist in the 4G SIM:
have an international mobile subscriber identifier (IMSI) read from the memory of the 4G SIM and sent to an available mobile network; or
have the SUPI from the memory of the 4G SIM read and sent to the available mobile network.

16. A non-transitory computer storage medium configured to store computer-readable instructions by one or more processors of a fifth generation cellular-wireless access technology (5G) user equipment (UE), that when executed, cause the one or more processors to perform operations comprising:
determining whether a mobile network operator (MNO) public key file exists in a fourth generation cellular-wireless access technology (4G) subscriber identity module (SIM) of the 5G UE;
upon determining that the MNO public key file exists in the 4G SIM:
retrieving an MNO public key value from the MNO public key file;
reading a subscription permanent identifier (SUPI) from the 4G SIM;
generating a subscription concealed identifier (SUCI) based on the SUPI and the MNO public key value; and
sending, by the communication module, the SUCI to a 5G mobile network for registering the 5G UE with the 5G mobile network; and upon determining that the public key file does not exist in the SIM:
  reading an international mobile subscriber identifier (IMSI) from the SIM and sending the IMSI to an available mobile network; or
  reading the SUPI from the SIM and sending the SUPI to the available mobile network.

17. The non-transitory computer storage medium of claim 16, wherein determining whether the MNO public key file exists in the 4G SIM includes:
  determining whether the MNO public key file exists in the 4G SIM upon powering on the 5G UE.

18. The non-transitory computer storage medium of claim 16, wherein the operations further comprise:
  receiving 5G services from the 5G mobile network upon registering with the 5G mobile network.

19. The non-transitory computer storage medium of claim 16, wherein the SUPI is one of:
  an international mobile subscriber identifier (IMSI), or
  an identifier based on the IMSI.

20. The non-transitory computer storage medium of claim 19, wherein generating the SUCI based on the SUPI and the MNO public key value includes:
  improving security of the IMSI by encrypting the SUPI based on the MNO public key value.

* * * * *